United States Patent [19]

Neild

[11] 4,235,324
[45] Nov. 25, 1980

[54] SAFETY CONTROL MECHANISM FOR PRESS BRAKE ASSEMBLY

[75] Inventor: Kenneth Neild, Binghamton, N.Y.

[73] Assignee: McIntosh Laboratory, Inc., Binghamton, N.Y.

[21] Appl. No.: 946,914

[22] Filed: Sep. 28, 1978

[51] Int. Cl.³ .......................... F16D 71/02; F16P 3/22
[52] U.S. Cl. ................................. 192/131 H; 100/53
[58] Field of Search .............. 100/53; 192/129 B, 132, 192/131 H

[56] References Cited

U.S. PATENT DOCUMENTS

| | | | |
|---|---|---|---|
| 1,748,063 | 2/1930 | Dreschler | 192/132 |
| 2,199,501 | 5/1940 | MacBlane | 192/131 H |
| 2,301,491 | 11/1942 | Yanchenko | 192/131 H |
| 2,594,251 | 4/1952 | Trathen | 100/53 X |
| 2,830,686 | 4/1958 | Blume et al. | 192/131 H |
| 2,946,277 | 7/1960 | Archer | 100/53 |
| 3,727,545 | 4/1973 | Madsen et al. | 100/53 |
| 4,131,189 | 12/1978 | Stephens | 192/131 H X |

Primary Examiner—Rodney H. Bonck
Attorney, Agent, or Firm—Pollock, Vande Sande & Priddy

[57] ABSTRACT

A safety control mechanism for a press brake assembly or the like, wherein an operator is required to continuously depress two hand control buttons to initiate movement of a ram from a top dead center position toward the workpiece. When the ram has come within a predetermined distance of a support die on which the workpiece is positioned, a foot pedal is actuable for controlling movement of the ram during actual contact with the workpiece and until the ram reaches top dead center. The operator is then free to grasp and position the workpiece during the actual work operation.

17 Claims, 5 Drawing Figures

SAFETY CONTROL MECHANISM FOR PRESS BRAKE ASSEMBLY

BACKGROUND OF THE INVENTION

The present invention generally relates to a safety control mechanism for a reciprocating press brake assembly of the type used to bend sheet metal or the like. In particular, the present invention is directed to a safety control mechanism requiring both of an operator's hands to actuate movement of a ram member toward a workpiece. After the ram comes within a predetermined distance of the workpiece, movement of the ram is automatically stopped, with a foot pedal being actuable for controlling further movement of the ram, thereby freeing the operator to grasp and position the workpiece during the actual work operation without fear of his hands being caught between the ram and workpiece.

While press brake assemblies for bending sheet metal are well known, safety control devices for such assemblies have generally proven unsatisfactory with regard to allowing an operator to control the placement of the workpiece during the work operation. It would be most desirable for an operator to be able to hold and place the workpiece as the ram assembly makes actual contact therewith, thereby allowing the operator to position the workpiece against guide stops and further allowing the operator to feel and recognize possible slippage of the workpiece during the bending operation.

The Occupational Safety and Health Administration (OSHA) requires than an operator's fingers be at least 12 inches from a ram and associated bending die as they approach one another, but the fingers can be placed much closer to the ram after the gap is reduced to ¼ inch or less.

An assembly which is typical of the prior art and which meets the OSHA requirements is disclosed in U.S. Pat. No. 2,199,501, issued May 7, 1940 to Mac-Blane, which suggests two hand controls and a foot control, wherein both hand controls must always be depressed to actuate movement of the ram assembly. This safety control mechanism does not allow for the handling of the workpiece and is difficult to precisely position the workpiece with respect to the ram.

As will be discussed in detail hereafter, applicant's new and useful invention solves the problems confronting the prior art, by providing a safety control mechanism which positively assures an operator's safety, while still allowing hand contact with the workpiece during the actual work operation.

OBJECTS AND SUMMARY OF THE PRESENT INVENTION

An object of the present invention is to provide a safety control mechanism for a press brake assembly capable of preventing injury to an operator's hands during reciprocating operation.

A further object of the present invention is to provide a safety control mechanism for a press brake assembly which allows an operator to contact and precisely position a workpiece during the actual work operation.

Another object of the present invention is to provide a safety control mechanism for a press brake, wherein actuation of the control system requires both of an operator's hands until the ram has come within a predetermined distance of the bending die at which time movement of the ram is automatically stopped, with a foot pedal being actuated to control further movement of the ram.

A further object of the present invention is to provide a safety control mechanism adaptable for easy attachment to a conventional press brake assembly or the like.

These and other objects of the present invention are achieved in a preferred enbodiment of the present invention wherein a plurality of interconnected valves are selectively actuated to control the reciprocal movement of the press brake ram.

During operation, an operator is required to continuously depress a pair of separate control buttons with each of his hands to initiate and maintain downward movement of the ram toward the workpiece, thereby preventing the operator from extending his hands between the ram and workpiece. When the press brake ram comes within a predetermined distance of a support die which is preferably ¼ inch or less, the safety control mechanism automatically actuates a foot pedal member for controlling further movement of the ram, thereby allowing the operator to grasp and maneuver the workpiece during the actual work operation. After the work operation has been completed, continued depression of the foot pedal causes the ram to reciprocate upwardly toward its top dead center position, at which time the ram is stopped with control being automatically transferred to the control buttons. In this manner, a new work cycle can only be initiated by depression of the pair of control buttons.

The safety control assembly of the present invention is not limited to use with a press brake described herein, but is intended for use with any device employing a reciprocating work member wherein it is desired to prevent accidental injury to an operator while at the same time, allowing the operator to grasp the workpiece during the actual work operation.

A clearer understanding of the present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein.

DETAILED DESCRIPTION OF THE PREFERRED EMBODIMENT

Figure 1:
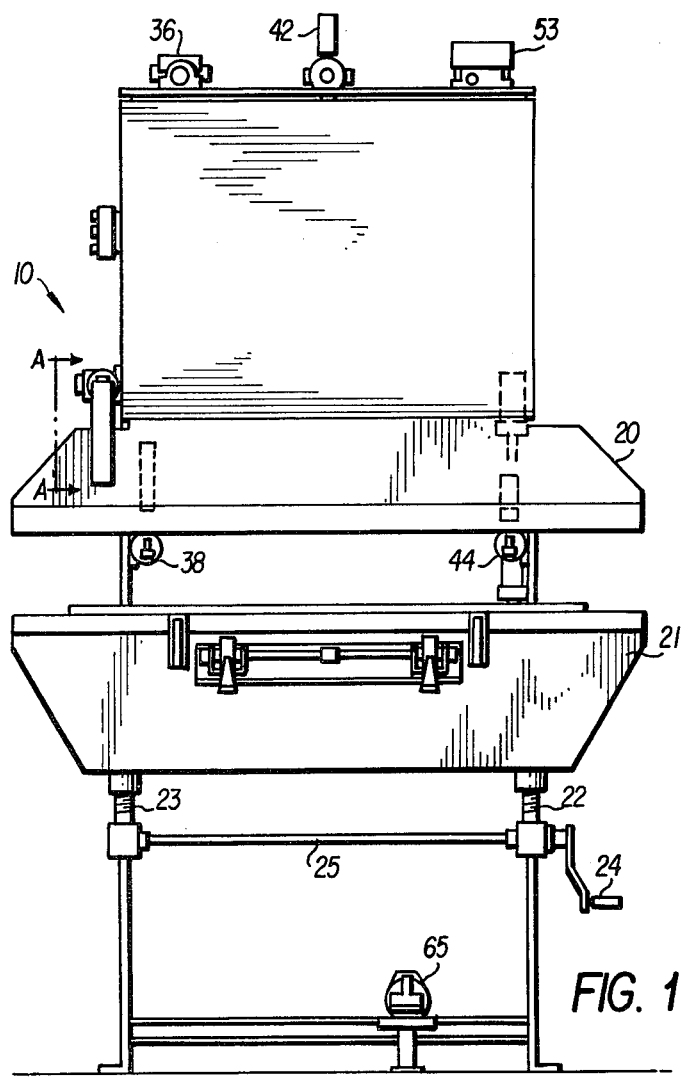
FIG. 1 shows a front view of a press brake assembly including a safety control mechanism constructed according to a preferred embodiment of the present invention.
Figure 2:
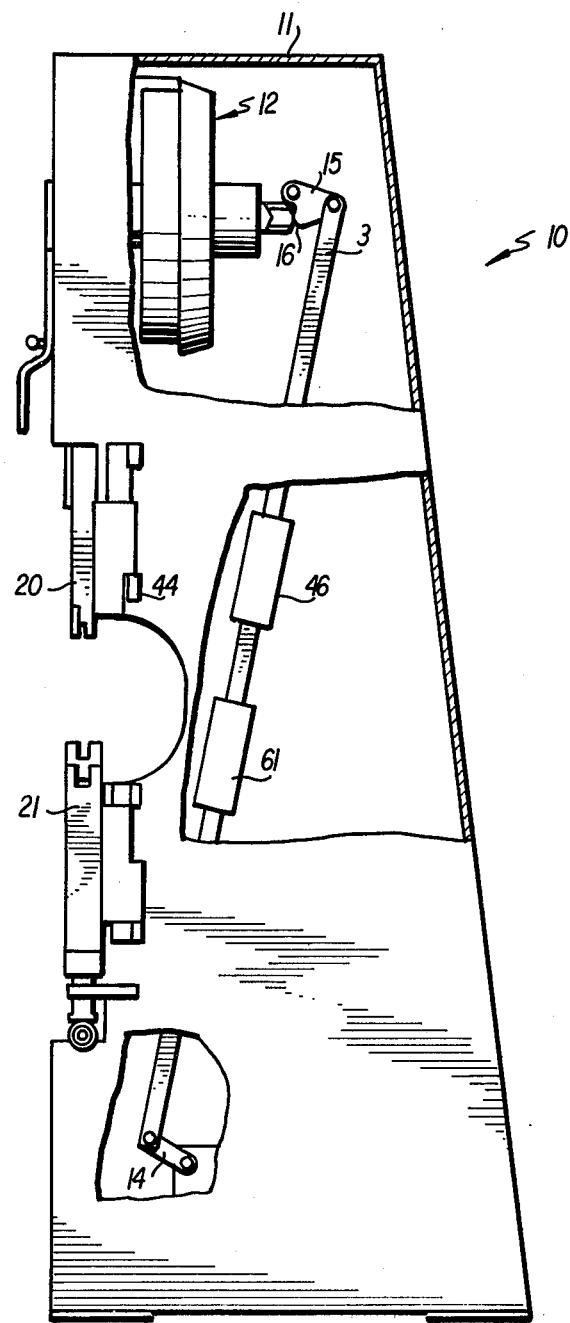
FIG. 2 shows a side view of the press brake assembly of FIG. 1.

Referring to the drawings, and FIGS. 1 and 2 in particular, a press brake assembly including a safety control system formed according to the present invention is generally indicated at 10. Press brake assembly 10 comprises a housing 11 which supports a conventional motor and belt drive assembly that has been deleted from the drawings for purposes of clarity.

A clutch and brake mechanism generally designated at 12 is mounted within housing 11 and functions to selectively transfer driving torque from a belt drive assembly to a ram member in a well-known manner. A control rod 13 is positioned within a housing 11 and is pivotally attached at a lower end to a connecting link 14 which, in turn, is pivotally attached to housing 11. An upper end of a control rod 13 is pivotally attached to a cam member 15 mounted in housing 11 and including a cam surface 16 which selectively contacts clutch mechanism 12. During operation, movement of control rod 13 causes cam surface 16 to contact and force clutch mechanism 12 into torque transmitting engagement. The precise manner in which control rod 13 is actuated will be described hereafter.

A ram assembly 20 is mounted on housing 11 for reciprocating movement relative to a fixed die support member 21 axially spaced therefrom. Ram 20 is powered by torque transferred from the drive motor through an associated belt drive and the clutch and brake mechanism 12 in a conventional manner, the details of which have been deleted for purposes of clarity. A workpiece placed on die 21 is deformed by the pressing contact of ram 20 and die 21. The vertical position of supporting die 21 relative to ram 20 can be adjusted by rotating threaded shafts 22 and 23, which are mounted on housing 11 and extend into similarly threaded bores formed in die 21. Rotation of crank member 24 and connecting member 25 functions to rotate shafts 22 and 23 to raise or lower die 21 respective to ram 20.

The safety control mechanism according to the preferred embodiment will now be described in detail.

Figure 5:
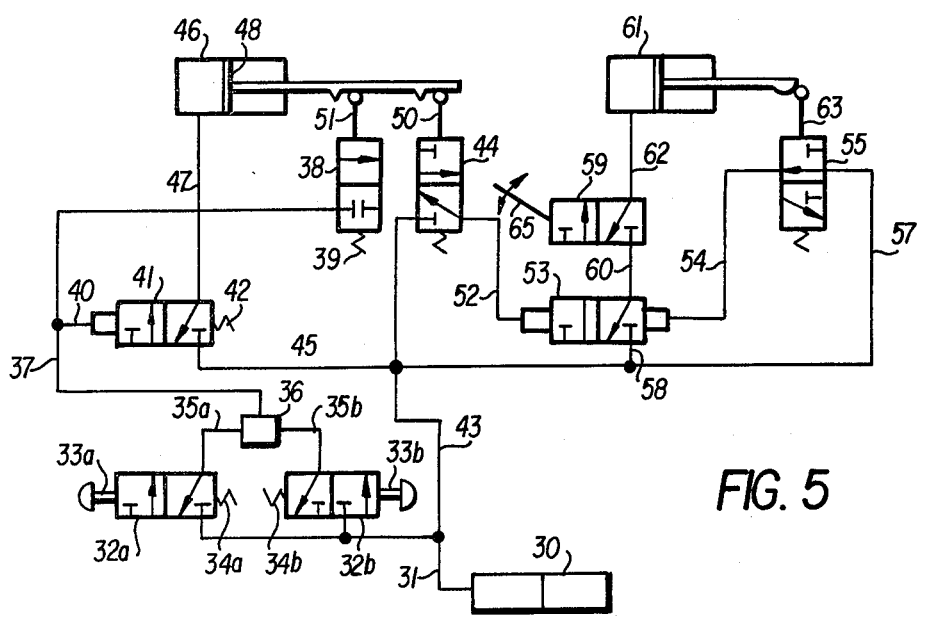
FIG. 5 shows a schematic representation of a safety control valve mechanism formed in accordance with the preferred embodiment of the present invention.

Referring to FIGS. 1 and 5 in particular, a source of pressurized fluid, such as air, is generally designated at 30. A fluid passageway 31 extends from source 30 to inports formed in plunger valves 32a and 32b, respectively. Each plunger valve 32a and 32b also includes a push button actuator 33a and 33b, respectively, with each valve being initially biased to a closed position via attached spring members 34a and 34b. Fluid passageways 35a and 35b extend between outports of valves 32a and 32b, respectively, and separate inports of a combining valve member 36 which is mounted on housing 11.

A single fluid passageway 37 extends from an outport of combining valve 36 to an inport of cam valve assembly 38, with valve 38 being biased to a closed position by attached spring member 39. A fluid passageway 40 extends from passageway 37 to an inport of a control valve 41 which is biased by a spring member 42 into an initially closed position.

A separate fluid passageway 43 joins passageway 31 and extends to an inport of a cam valve assembly 44. A further passageway 45 extends between passageway 43 and an inport of valve 41, with an outport of valve 41 being in fluid communication with a hollow cylinder 46 via passageway 47. Cylinder 46 may be mounted on frame 11 and encloses a piston and rod assembly, wherein the rod is fastened to control rod 13 providing joint motion therewith.

Figure 3:
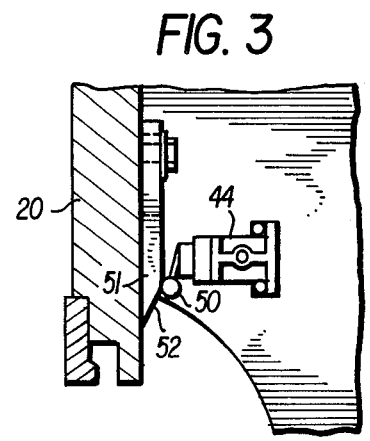
FIG. 3 shows a blow up view of a portion of FIG. 2 including a cam actuable valve assembly positioned on the press brake assembly.

Similarly shaped cam valve assemblies 38 and 44 are each mounted on opposite sides of housing 11. Referring to FIG. 3, cam valve 44 includes a cam actuator 50 extending toward ram 20, with a cam member 51 attached to a lower end portion of ram 20, and including a wedge shaped end surface 52. Cam valve 38 includes a similarly shaped cam actuator 51 and a separate cam member, not shown.

Referring again to FIG. 5, a fluid passageway 52 extends between an outport of cam valve 44 and a first end of plunger control valve 53. A further fluid passageway 54 connects a second end of valve 53 with an outport of a cam valve assembly 55, which is spring biased to an initially closed position. A fluid passageway 57 connects an inport of cam valve 55 with fluid passageway 43. An inport of control valve 53 is also connected to passageway 57 via passageway 58, while an output of valve 53 is connected to an inport of foot controlled valve 59 via passageway 60. Finally, an outport of foot valve 59 is connected to a cylinder 61 through a separate passageway 62.

Figure 4:
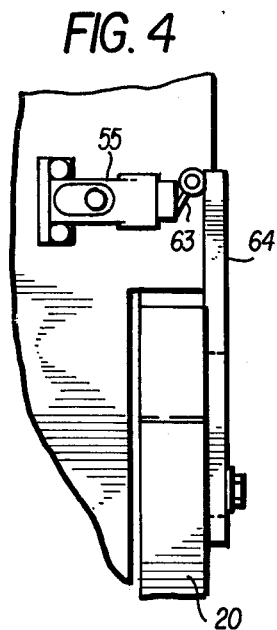
FIG. 4 shows a blow up view of a section taken along line AA of FIG. 1 including a further cam valve assembly positioned according to the present invention.

Cylinder 61 is similar in structure to cylinder 46 in that it is attached to frame 11 and includes a piston and rod assembly fastened to control rod 13. Likewise, cam valve 55 is similar to cam valves 38 and 44 and, as shown in FIG. 4, includes a cam actuator 63 extending therefrom. A cam member 64 may be attached to a vertically upper end of ram 20 for contact with actuator 63 as will be described hereafter. Furthermore, a conventional foot pedal actuator 65 is mounted in housing 11 and is attached to foot control valve 59.

The operation of the safety control device of the present invention will now be described with reference to the drawings, and in particulr to FIG. 5. At the beginning of an operating cycle, it is assumed that ram 20 is at a top dead center position, with only cam valve 55 being forced into an open position against its biasing spring, to allow fluid flow therethrough. The fluid then passes through valve 55, passageway 54 and acts against the second control end of valve 53 thereby closing valve 53 and removing the pressure against foot control valve 59.

An operator grasps and depresses push buttons 33a and 33b with each of his hands to open valves 32a and 32b, respectively. A pressurized fluid, such as air, is then allowed to flow from souce 30, through passageway 31, to open valves 32a and 32b, and into passageways 35a and 35b leading to valve 36. Valve 36 is only opened by a combination of fluids from flow paths 35a and 35b, which ensures that an operator must continuously depress both button members 33a and 33b to maintain valve 36 in an open position.

As a further safety control, valve 36 is designed to be actuated only when push buttons 33a and 33b are depressed within a predetermined time. In a preferred embodiment, push buttons 33a and 33b must be depressed within 0.5 seconds of each other to open valve 36. If a longer time passes between depression of the first and second buttons, valve 36 will remain closed. The time control forces an operator to depress both push buttons 33a and 33b at substantially the same time, thereby reducing the chances of injury to the operator.

After valve 36 is forced into an open position, fluid flows into and through passageway 37 until it reaches the initially closed inport of cam valve 38. The pressurized fluid in passageway 37 also flows through passageway 40 to force valve 41 into its open position. The opening of valve 41 allows pressurized fluid to flow from source 30, through passageways 31, 43, 45 and valve 41 into passageway 47 and cylinder 46. As pressurized fluid fills a chamber in cylinder 46, piston 48 and its attached rod move and force attached control rod 13 to move therewith.

As control rod 13 moves, it causes cam member 15 to pivot with cam portion 16 engaging clutch mechanism 12. Further movement of rod 13 forces cam portion 16 to engage clutch 12, resulting in the rotative torque from the drive motor being transferred to the belt drive assembly, causing ram 20 to being a downward movement toward fixed support die 21 and a workpiece mounted thereon. It is noted that movement of ram 20 continues only as long as both buttons 33a and 33b remain depressed. If either button is released, valve 36 will automatically close, reducing pressure in passageway 37, which allows valve 41 to close and cut off the flow of pressurized fluid to cylinder 46, with the fluid in passageway 47 being exhausted through valve 41 to stop movement of cylinder 46.

After ram 20 has moved within a predetermined distance of the support die 21, preferably ¼ inch or less to meet OSHA requirement, the wedge shaped cam members attached to ram 20 will simultaneously contact and deflect actuators 51 and 50 of cam valves 38 and 44, respectively. As cam actuator 51 is deflected, it moves valve 38 to its open position allowing the pressurized air in passageway 37 to flow through valve 38 and dissipate into the atmosphere. As a result, the fluid pressure within passageways 37 and 40 is reduced and valve 41 is then biased by attached spring 42 to its closed position. The pressurized air within passageway 47 and cylinder 46 can exhaust through closed valve 41, which removes the drive force from rod 13 and allows the clutch portion mechanism 12 to disengage, with the brake portion being automatically actuated to prevent any movement of ram 20. This stops the downward movement of ram 20 and frees the operator to remove his hands from buttons 33a and 33b and grasp and position the workpiece as desired.

Because both cam valves 38 and 44 are deflected by movement of ram 20, a fluid passage through initially closed valve 44 is now opened via deflection of cam actuator 50. Pressurized fluid flows from source 30 through passageways 31, 43, valve 44 and into passageway 52, striking the first end of control 53, and causing initially closed control valve 53 to move to its open position. Fluid in passageway 43 flows through passageways 57, 58, open valve 53 and into passageway 60.

The operator can now control further downward movement of ram 20 by stepping on foot pedal actuator 65, which causes foot control valve 59 to move from a closed position to an open position. As valve 59 opens, fluid passes from passageway 60, through valve 59, and through further passageway 62 into cylinder 61. Cylinder 61 operates in a manner similar to cylinder 46, with the pressurized fluid causing the piston rod and attached control rod 13 to move and engage clutch mechanism 12 to cause movement of ram 20. The speed of reciprocating ram 20 is directly controllable by the amount of depression of pedal 65 which directly affects the size of the flow path through valve 59.

After the ram 20 has completed its downward motion, it begins reciprocating in an upwardly direction. As ram 20 approaches top dead center, cam member 64 contacts and deflects actuator 63, forcing cam valve 55 which is biased closed to move to an open position. This allows fluid within passageway 57 to flow through valve 55 and passageway 54. Fluid contacts the second end valve 53, moving valve 53 to a closed position, which allows fluid in passageways 62 and 60 to exhaust through valve 53 into the atmosphere and making further foot controlled operation of ram 20 impossible. To initiate a further cycle of ram member 20, buttons 33a and 33b must be again continuously depressed by the operator.

The preferred embodiment of the present invention has been described with the use of pressurized air as the control fluid. It would, of course, be possible to substitute other fluids for pressurized air, with the exhaust ports of the various valves being connected to a sump for collecting the fluid in a well-known manner, rather than dissipating the pressurized fluid into the atmosphere. Furthermore, the cam members 51 and 64 can be positioned on housing 11 to stop the movement of ram 20 at any predetermined position, with the distances chosen in the preferred embodiment meeting the outstanding OSHA requirement.

In the preferred embodiment, a pressurized fluid control assembly controls movements of the ram member. It is within the scope of the present invention to substitute either an electrical control assembly or a combination of electrical and fluid control assembly for the fluid control assembly described hereabove.

The present invention is not limited to the above-described embodiment, but is limited only by the scope of the following claims.

What is claimed is:

1. In a press brake housing assembly having a reciprocating ram driven by torque transmitted through a clutch and brake mechanism, a safety control mechanism for selectively reciprocating said ram into contact with a workpiece while preventing an operator from positioning one or both hands adjacent to the ram until said ram comes within a predetermined distance from said workpiece, said safety control comprising:

motive means for driving said ram through a reciprocal cycle of movement;

hand control means effective when actuated by two hands of an operator to energize said motive means for driving said ram from a top dead center position toward said workpiece;

further control means effective when actuated by said operator to maintain said motive means energized; and safety means for inhibiting operation of said further control means until said ram is within a predetermined distance from said workpiece.

2. An apparatus according to claim 1 wherein said motive means comprises a clutch and brake assembly selectively actuable for transferring torque from a drive motor to a belt assembly for reciprocating said ram member.

3. An apparatus according to claim 1, wherein said further control means comprises a foot pedal valve assembly.

4. In a press brake housing assembly having a reciprocating ram driven by torque transmitted through a clutch and brake mechanism, the present invention comprises a safety control mechanism for precisely positioning said ram through selective engagement of said clutch and brake mechanism, said safety control comprising:

a control rod assembly pivotally mounted within said press brake assembly for engaging said clutch mechanism to reciporcate said ram toward a fixed support surface having a workpiece positioned thereon;

first and second fluid drive means each having an inport in fluid communication with a source of pressurized fluid via a separate fluid passageway, each of said first and second drive means being actuable by pressurized fluid for moving said control rod to engage said clutch and cause reciprocal movement of said ram member;

first and second hand actuable plunger valves assemblies each positioned within the fluid passageway extending between said source and said first fluid drive means, with each plunger valve assembly being spring biased to a closed position and having a control button which is depressed to open a flow path therethrough;

control valve means for delivering pressurized fluid to said first fluid drive means in response to continuous depression of both said control buttons of said respective plunger valves;

first cam valve means for exhausting the pressurized fluid from said first drive means in response to said ram coming with a predetermined distance of said fixed support to stop the movement of said ram;

foot actuating valve assembly positioned within a separate fluid passageway leading from the source of pressurized fluid to said second drive means;

a slide valve assembly positioned in said separate fluid passageway between said source and said foot actuating valve assembly with said slide valve being normally biased closed;

second cam valve means for automatically opening said slide valve responsive to said ram coming within said predetermined distance of said fixed support member, allowing pressurized fluid to flow through said separate passageway from the source to said foot actuating valve assembly;

whereupon depression of a foot pedal opens said foot actuating valve for delivering pressurized fluid to said second fluid drive means for moving said ram through the remainder of its work cycle.

5. A safety control mechanism according to claim 4, wherein said pressurized fluid comprises air.

6. A safety control mechanism according to claim 4, including a third cam valve means for exhausting said second drive means as said ram reciprocates upwardly approaching top dead center position.

7. A safety control mechanism according to claim 6, wherein said third cam valve means comprises a valve assembly mounted on a side wall of said press brake assembly and including a deflectable cam actuating member extending therefrom, said third cam means further including a cam member attached to a vertically upper end portion of said ram and axially aligned with said cam actuating member, wherein said cam member deflects said actuating arm as said ram approaches a top dead center position to force said third cam valve into an open position.

8. A safety control mechanism according to claim 7, wherein an inport of said third cam valve assembly is in fluid communication with the pressurized fluid source and an outport of said third cam valve is in fluid communication with said slide valve assembly, with fluid passing through said third cam valve forcing said slide valve to a closed position to prevent further actuation of said second drive means via said foot actuating valve assembly.

9. A safety control mechanism according to claim 4, wherein said control rod assembly includes a control rod having a first end pivotally attached to a cam member with said cam member being pivotally mounted within said press brake and having a cam surface in abutting contact with an actuator assembly attached to said clutch mechanism.

10. A safety control mechanism according to claim 4, wherein said first and second drive means each comprises a fluid cylinder assembly attached to said press brake assembly, each fluid cylinder enclosing a piston and rod assembly with said rod being attached to said control rod for joint movement, wherein fluid introduced into each cylinder through an inport causes said piston and attached rod to move, further causing said control rod to move therewith.

11. A safety control mechanism according to claim 4, wherein said control valve means comprises a combining valve having a pair of inports for receiving fluid from said first and second hand actuable valves, said combining valve being normally biased to a closed position and forced to an open position by a combination of fluid delivered through both inports.

12. A safety control mechanism according to claim 8, wherein said control valve means further comprises an actuating valve positioned within said fluid passageway between said source and said first drive means which is normally biased to a closed position.

said actuating valve having an actuator in fluid communication with an outport of said combining valve, wherein fluid exiting from said combining valve forces said actuator valve into an open position, allowing pressurized fluid to actuate said first fluid drive means.

13. A safety control mechanism according to claim 12, wherein said control valve includes sensing means for opening said control valve only upon substantially simultaneous depression of both said first and second hand actuable plunger assemblies.

14. A safety control mechanism according to claim 12, wherein said control valve includes sensing means for opening said control valve only upon depressing both said first and second hand actuable plunger assemblies within 0.5 seconds of one another.

15. A safety control mechanism according to claim 12, wherein said first and second cam valve means each comprises a valve assembly mounted on opposite sides of said press brake assembly and normally biased closed with each valve assembly including a cam actuating member extending therefrom;

each valve assembly further includes a cam member attached to said ram in axial alignment with said cam actuating member, wherein said cam members each contact and deflect said respective cam actuating members as said ram comes within a predetermined distance of said fixed supporting member.

16. A safety control mechanism according to claim 15, wherein an outport of said combining valve is in fluid communication with an inport of said first cam valve assembly biased to a closed position, with deflection of said actuating arm opening said first cam valve assembly to allow pressurized fluid to flow from said combining valve and through said first cam valve reducing the fluid pressure against said actuating valve and causing said valve to close via spring bias pressure, resulting in said fluid exiting said first drive and exhausting through said closed actuating valve.

17. A safety control mechanism according to claim 15, wherein said second cam valve assembly is normally biased to a closed position with deflection of said respective actuating member causing said second cam valve to move to an open position, allowing pressurized fluid to flow from the source, through said second cam valve and into contact with said slide valve, causing said slide valve to move to an open position.

* * * * *